Oct. 19, 1943.  A. SCHUSTERMAN  2,332,474
ROLLED COLOR SEPARATION FILM FOR BOX CAMERAS AND THE LIKE
Filed Nov. 15, 1941
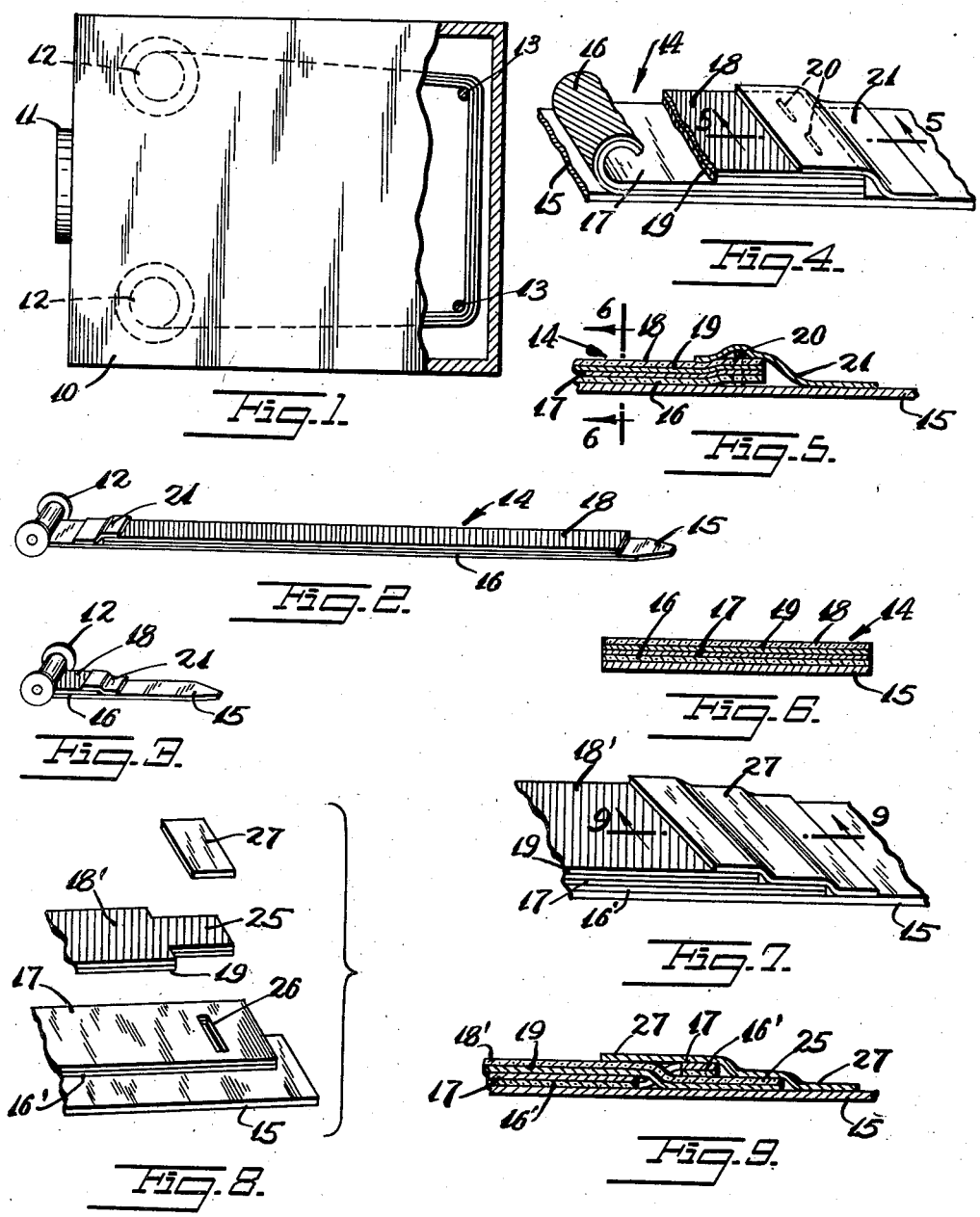
INVENTOR.
Adolph Schusterman
BY
ATTORNEY Patented Oct. 19, 1943

2,332,474

UNITED STATES PATENT OFFICE 2,332,474

ROLLED COLOR SEPARATION FILM FOR BOX CAMERAS AND THE LIKE

Adolph Schusterman, New York, N. Y.

Application November 15, 1941, Serial No. 419,236

3 Claims. (Cl. 95—2)

This invention relates to new and useful improvements in rolled color separation film for box cameras and the like for making natural color photographs.

More specifically, the invention proposes the construction of a roll of color separating film embodying the required properties for taking natural color photographs with a conventionally constructed box camera.

Still further, it is proposed to characterize the roll of color separation film by a backing sheet designed to act as a lead and backing strip and upon which superimposed strips of film are mounted with their emulsion sides contacting each other in a manner to permit the red colored back side of one of the films (preferably Verichrome (orthochromatic) film) to act as a filter for both of the films.

A further object of the invention proposes certain novel means for mounting the superimposed film strips upon the backing sheet in a manner to insure the proper advancement of both of the film strips simultaneously.

A still further object of the invention is the construction of separation film for taking natural color photographs, as mentioned, which may be developed and used for printing natural color pictures according to known processes.

Another object of the invention is the construction of a roll of color separation film which is simple and durable and which may be manufactured and sold at a reasonable price.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a conventionally constructed box camera having a portion thereof broken away to illustrate the application of a color separation film constructed in accordance with this invention.

Fig. 2 is a perspective view illustrating the method of applying a color separation film to a film spool.

Fig. 3 is a perspective view somewhat similar to that of Fig. 2, but illustrating a further step in winding the color separation film upon the film spool.

Fig. 4 is an enlarged perspective view of a portion of Fig. 3.

Fig. 5 is a partial longitudinal sectional view taken on the line 5—5 of Fig. 4.

Fig. 6 is a vertical sectional view taken on the line 6—6 of Fig. 5.

Fig. 7 is a view similar to Fig. 4, but illustrating a modified form of the invention.

Fig. 8 is a view of the portions of the color separation film shown in Fig. 7 separated and in perspective.

Fig. 9 is a partial longitudinal sectional view taken on the line 9—9 of Fig. 7.

The roll of color separation film constructed in accordance with this invention, is to be used in combination with the conventionally constructed box camera 10 having a lens 11. The interior of the camera is provided with a conventional means for supporting the film spools 12 and rollers 13 over which the film is extended at the back of the camera. The camera 10 is also provided with the usual means for turning one of the spools 12 to advance the film, which means is not shown on the drawing as it forms no part of this invention.

The color separation film according to this invention, includes a three layer roll 14 wound upon one of the spools 12. The layers of the roll 14 consists of an opaque protective lead and backing strip 15. This backing strip is of the type generally used for backing panchromatic film.

Superimposed upon the backing strip 15 there is mounted a strip of panchromatic film 16. This strip of panchromatic film has its emulsion side 17 turned away from the backing strip to be exposed towards the lens 11 of the camera 10.

Superimposed upon the strip of panchromatic film 16 there is mounted a strip of Verichrome (orthochromatic) film 18. The strip of (orthochromatic) film 18 has its emulsion side 19 turned away from the lens 11 of the camera 10 causing the emulsion sides of the films 16 and 18 to be immediately adjacent one another.

Novel means is provided for attaching the ends of the strips of film 16 and 18 to the backing strip 15. To accomplish this the ends of the strips of film 16 and 18 are secured together by means of an adjacent pair of staples 20 engaged through these ends. The attached ends are then secured to the backing strip 15 by short lengths of adhesive tape 21, attached partially to the film 18 and partially to the backing strip 15.

Figs. 2 and 3 illustrate the method employed for positioning the films upon the spool 12. The process used consists in first attaching one end of the backing strip 15 to the spool. Then one pair of adjacent ends of the films 16 and 18 is secured together by the staples 20, and these joined ends are secured to the backing strip 15 by the tape 21. The backing strip 15 and the films are then rolled upon the spool 12 until the free ends of the films are reached. The free ends of the films 16 and 18 are then secured together and these joined ends are then attached to the backing strip 15 and the rolling is finished, completing the application of the color separating film to the spool 12.

With the Verichrome (orthochromatic) film placed in front of the panchromatic film 16, with the emulsion sides of the films together, the red backing on the Verichrome (orthochromatic) film 18 acts as a filter for both the Verichrome (orthochromatic) film 18 and the panchromatic film 16.

The Verichrome (orthochromatic) film 18 is sensitive to blue light but not red light. The panchromatic film 16, on the other hand, is sensitive to red light. Consequently, the Verichrome (orthochromatic) film 18 is the red printer and panchromatic film 16 is the blue printer, as the color to which the particular film is sensitive to, turns black when the film is exposed and cannot be printed.

The method of using the color separation film in accordance with this invention is as follows:

A roll of film having the dual films 16 and 18 is purchased in the usual manner and is mounted in position within a conventional box camera 10. The sections of the film are exposed in the usual manner and the completely exposed film is then removed from the camera.

The roll 14 is unwound and the films 16 and 18 are then separated and developed independently of one another. The developed films 16 and 18 are then used for printing colored pictures according to known processes.

According to the form of the invention shown in Figs. 7 to 9 the construction of the color separation film is somewhat similar to that previously described and consists of a roll of film having a backing sheet 15. Superimposed upon the backing sheet 15 there is mounted a strip of panchromatic film 16' with its emulsion side 17 directed away from the backing strip 15. Superimposed upon the panchromatic film 16' there is mounted a strip of Verichrome (orthochromatic) film 18' with its emulsion side 19 directed towards the emulsion side 17 of the panchromatic film 16'.

This form of the invention differs from the previous form of the invention in the manner in which the ends of the strips of film 16' and 18' are mounted upon the backing strip 15. To accomplish this modified form of mounting the strip of Verichrome (orthochromatic) film 18' is formed with reduced shoulders forming a tongue 25 at each end of the strip of film 18'. The strip of panchromatic film 16' is formed at points spaced slightly inwards from its ends with slots 26. These slots 26 are substantially equal in length to the width of the tongues 25 formed upon the ends of the strip of film 18'. The tongues 25, in assembling the films 16' and 18', are threaded through the slots 26, as shown in Fig. 9, to project slightly beyond the end of the strip of film 16'.

A strip of adhesive tape 27 is provided for each of the ends of the films. Each tape 27 is secured to the exposed face of the strip of Verichrome (orthochromatic) film 18', the exposed end of the strip of panchromatic film 16', the exposed end of the tongue 25 and the face of the backing strip 15 for securely mounting the strips of film in position on the backing strip.

In other respects this form of the invention is similar to that previously described, and like reference numerals are used to identify like parts in each of the several views.

While I have illustrated and described the preferred embodiments of my invention, it is to be understood that I do not limit myself to the precise construction herein disclosed and the right is reserved to all changes and modifications coming with the scope of the invention as defined in the appended claims.

Having thus described my invention, what I claim as new, and desire to secure by United States Letters Patent is:

1. A roll of color separation film for box cameras and the like, comprising a three layer roll, one of said layers being an opaque protective lead and backing strip, the adjacent layer being a panchromatic film, and the next layer being an orthochromatic film, and means for mounting said films securely in position upon said backing strip, comprising tongues formed on the ends of one of said films and engageable through complementary slots formed in the ends of the other of said films, and means for securing the interengaged ends in position upon the backing strip.

2. A roll of color separation film for box cameras and the like, comprising a three layer roll, one of said layers being an opaque protective lead and backing strip, the adjacent layer being a panchromatic film, and the next layer being an orthochromatic film, and means for mounting said films securely in position upon said backing strip, comprising tongues formed on the ends of one of said films and engageable through complementary slots formed in the ends of the other of said films, and means for securing the interengaged ends in position upon the backing strip, comprising strips of adhesive tape secured partially to said interengaged ends and partially to said backing strip.

3. A roll of color separation film for box cameras and the like, comprising a layer of opaque protective lead and backing strip, superimposed layers of color sensitive film positioned on said backing strip, tongues formed on the ends of one of said films and engageable with complementary slots formed in the ends of the other of said films connecting the films against relative movement, and strips of adhesive tape secured partially to the interengaged ends of said films and partially to the adjacent face of said backing strip adjacent the interengaged ends for mounting said films in position on said backing strip.

ADOLPH SCHUSTERMAN.